United States Patent [19]

Van der Lely

[11] Patent Number: 4,645,075
[45] Date of Patent: Feb. 24, 1987

[54] CASSETTE HOLDER COMPRISING A PLURALITY OF COMPARTMENTS, EACH INTENDED FOR RECEIVING A MAGNETIC-TAPE CASSETTE

[75] Inventor: Piet Van der Lely, Knegsel, Netherlands

[73] Assignee: U. S. Philips Corporation, New York, N.Y.

[21] Appl. No.: 741,987

[22] Filed: Jun. 6, 1985

[30] Foreign Application Priority Data

Jul. 19, 1984 [NL] Netherlands ............... 8402285

[51] Int. Cl.⁴ .................................. B65D 85/672
[52] U.S. Cl. ..................... 206/387; 211/41; 312/12
[58] Field of Search ............ 206/387; 312/8, 12; 211/41

[56] References Cited

U.S. PATENT DOCUMENTS

| | | | |
|---|---|---|---|
| 3,702,132 | 11/1972 | Fites et al. ................... | 206/387 |
| 4,240,551 | 12/1980 | Osanai ........................ | 206/387 |
| 4,253,567 | 3/1981 | Goldammer ................ | 206/387 |
| 4,285,554 | 8/1981 | Bell et al. .................... | 206/387 |
| 4,287,989 | 9/1981 | Plummer .................... | 206/387 |
| 4,358,018 | 11/1982 | Wolfe ......................... | 206/387 |
| 4,365,713 | 12/1982 | Ekuan ........................ | 206/387 |
| 4,383,610 | 5/1983 | Boshears .................... | 206/387 |
| 4,406,369 | 9/1983 | Wallace et al. ............. | 206/387 |

FOREIGN PATENT DOCUMENTS

| | | | |
|---|---|---|---|
| 2730455 | 1/1979 | Fed. Rep. of Germany | 206/387 |
| 3102961 | 1/1981 | Fed. Rep. of Germany . | |
| 8001570 | 10/1981 | Netherlands ............... | 206/387 |

Primary Examiner—William Price
Assistant Examiner—Jimmy G. Foster
Attorney, Agent, or Firm—David R. Treacy

[57] ABSTRACT

A cassette holder for storage of up to 8 magnetic-tape cassettes in a package having major dimensions similar to the sleeve for a 12-inch phonograph record. Each compartment is formed by mirror-symmetrical holder walls having guide channels formed therein, in an insertion direction, for accepting a cassette such as a compact cassette having a raised housing portion. Near the end of each compartment, remote from the insertion opening, each holder wall has a clamping element arranged to engage a major wall of an inserted cassette at a location adjacent the short side wall of the cassette.

10 Claims, 6 Drawing Figures

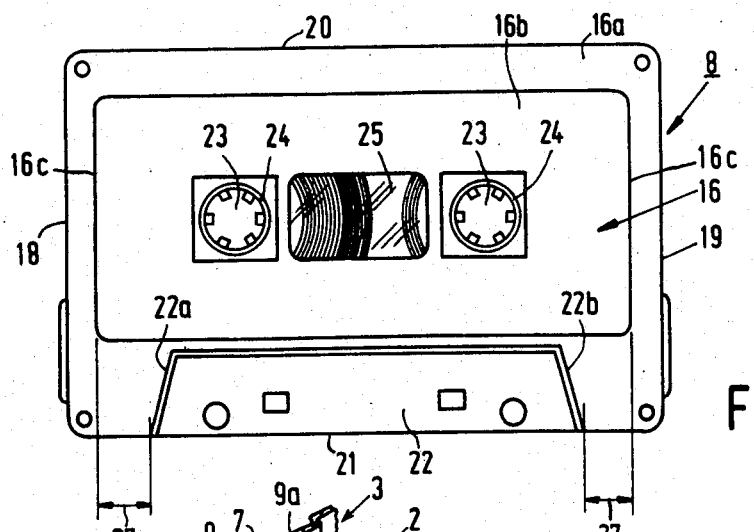
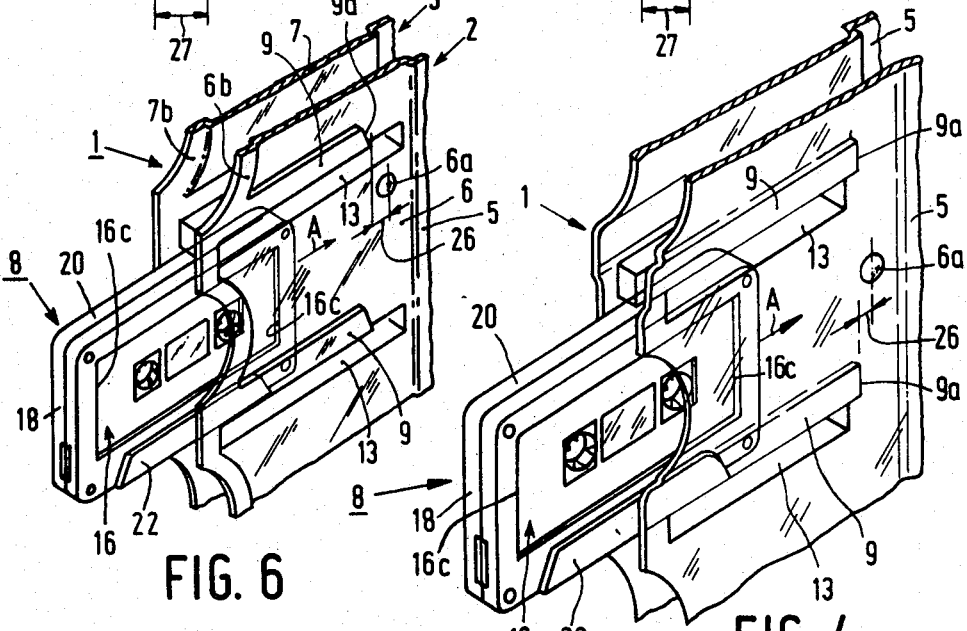
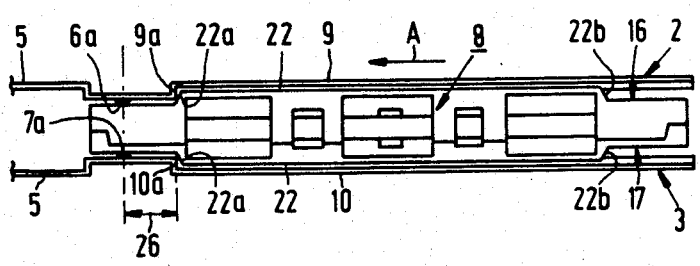

CASSETTE HOLDER COMPRISING A PLURALITY OF COMPARTMENTS, EACH INTENDED FOR RECEIVING A MAGNETIC-TAPE CASSETTE

BACKGROUND OF THE INVENTION

The invention relates to a cassette holder comprising a plurality of compartments, each intended for receiving a magnetic-tape cassette, which magnetic-tape cassette comprises a cassette housing having two mutually parallel substantially rectangular major walls, two short side walls and two parallel long side walls, which major walls each have a base surface and a central surface which is recessed relative to the base surface and, at least near the two short side walls, is connected to the base surface by edge wall portions. Raised housing portions, which adjoin a long side wall, project from the two major walls. The compartments of the cassette holder each comprise an insertion opening and two mutually parallel holder walls, of which at least one holder wall is formed with a guide channel which extends from the insertion opening in the direction of insertion of the cassette and which is raised relative to the holder wall to guide the raised housing portion of the cassette when the cassette is inserted into the compartment in the longitudinal direction of the cassette. The holder wall is also formed with a projecting clamping element on the inner surface of the holder wall to clamp the cassette inside the compartment after it has been inserted up to a stop.

Such a holder is known from German Patent Application No. 31 02 961 published Sept. 2, 1982, and is intended for the storage of a plurality of magnetic audio tape cassettes of the "compact cassette" type. This known cassette holder comprises a plurality of compartments formed by a flat bottom plate to which a profiled plastics holder wall is secured. The clamping element in each compartment of this holder is located in such a way that this element clamps an inserted magnetic-tape cassette in position against an edge which bounds an opening in one of the major walls, which opening is situated in a central portion of the central surface. This opening is coaxial with a reel hub of the cassette which is situated below the opening. As a result of this clamping method the clamping element rubs over the central surface of the cassette housing over a fairly long distance when the cassette is inserted into a compartment. The friction between the central surface and the clamping element, which projects comparatively far, demands some effort to insert the cassette. This may lead to scratches on the central surface of the cassette, which may be very annoying if this central surface has been provided with a cassette label. Further, the holder wall of the known cassette holder is formed with two guide channels, enabling the cassette to be inserted in two positions, i.e. with the raised housing portion to the left or to the right. The various cassettes which have been inserted may therefore be in different positions in the cassette holder, so that the cassettes are stored in the holder in a haphazard manner, which may be inconvenient.

SUMMARY OF THE INVENTION

It is the object of the invention to ensure that the cassettes are stored in such a cassette holder in a more orderly fashion and to facilitate insertion into and clamping of the cassettes in the compartments.

To this end the invention is characterized in that the two holder walls of each compartment are arranged mirror-symmetrically relative to each other and are each formed with one guide channel and one clamping element. The guide channel has an end wall at the end, which is remote from the insertion opening, which end wall forms a stop for the raised housing portion to limit the insertion depth of the cassette, and the location of each clamping element on the holder wall near the end of the compartment which is remote from the insertion opening is such that the clamping element acts against that central edge in the major surface wall portion of an inserted cassette which is remote from the insertion opening.

This enables a cassette to be readily inserted into each of the compartments of the cassette holder in accordance with the invention. The clamping elements, which are situated on the holder at opposite sides of the cassette, slide over the adjacent base surface of the cassette over a short distance only and, immediately after the raised housing portion has reached the end wall of the guide channel, engage behind the edge in the major wall between the base surface and the central surface. This can be achieved by correctly positioning the clamping element relative to the end wall of the guide channel, the distance between the clamping element and the end wall, measured in a plane parallel to the holder wall in a direction parallel to the longitudinal axis of the guide channel, preferably being equal to the distance, measured in a plane parallel to the cassette major wall in a direction parallel to the long side walls, between a side of the raised housing portion which faces a short side wall and the edge in the major wall portion of the cassette. Since this edge between the central surface and the base surface of the major wall extends parallel to the short side wall of the cassette over some distance the clamping element may be positioned at an arbitrary location on the holder wall within an area corresponding to the last-mentioned distance.

As a result of the mirror-symmetrical construction of the holder walls both the end wall of the guide channel and the clamping element are situated on opposite sides of the cassette, which ensures proper clamping. As each holder wall has only one guide channel, a convenient cassette storage system can be obtained if the guide channels of the various compartments of the holder are arranged in the same way. The mirror-symmetrical construction of the two holder walls also has the advantage that they can be manufactured from a plastic by means of only one mold. Therefore, the cassette holder is simple and easy to manufacture. Further, if the two holder walls are made of a transparent plastics, this has the advantage that the cassettes are visible from both sides, so that the labels on the cassette major walls can be read from both sides of the holder.

A preferred embodiment of the invention, comprising two rows of compartments, is characterized in that the rows of compartments are spaced from each other and the holder comprises a flat central portion between the rows of compartments on both sides. Thus, the area between the two rows of compartments on the flat central portion provides room for a comparatively large label on which notes can be made relating to the contents of the recordings made on the various cassettes. This makes the cassette holder even more convenient.

In this respect a preferred embodiment of the invention is characterized in that each row comprises four compartments and the outer edges of the holder are arranged as a square. By arranging the compartments in rows of four for four compact cassettes to be inserted in their longitudinal direction, the length of the two facing outer edges in which the insertion openings are situated corresponds substantially to a sleeve of a 30-cm (12 inch) long-play record. By giving the two other outer edges the same length, the outer dimensions of the holder in accordance with the invention will be equal to those of said sleeve. This enables the holder to be used in the same storage system as used for LP record sleeves, so that a collection of magnetic-tape cassettes together with a collection of gramophone records can be stored in a compact and simple manner.

Another preferred embodiment of the invention is characterized in that the holder comprises two identical plastic holder halves, in which the holder walls of the compartments are situated and which holder halves are interconnected between the two rows of adjacent compartments. By constructing the holder from two identical plastics halves and by thus interconnecting the adjacent rows of compartments a holder is obtained which is easy to manufacture and which is particularly suitable for mass production.

A further preferred embodiment of the invention is characterized in that in the holder halves between the respective compartments elongate connecting elements are formed, which are recessed relative to the holder walls and which are connected to each other in pairs to interconnect the two holder halves. The elongate connecting elements provide a satisfactory interconnection between the two holder halves and also provide a satisfactory separation between the compartments.

In this respect another preferred embodiment of the invention is characterized in that the longitudinal axes of the connecting elements extend parallel to the direction of insertion of a cassette and each holder half has wall portions perpendicular to the holder walls, extending parallel to the direction of insertion, the respective wall portions of a pair of adjoining connecting elements constituting side walls of the compartments. In this way the connecting elements form side walls which provide an effective guidance for the cassettes when the cassettes are inserted.

Yet another preferred embodiment of the invention is characterized in that near the insertion opening each holder wall comprises a raised edge portion which is situated at the same level as the bottom portion of the guide channel. Thus, the distance between the holder walls is slightly larger near the insertion opening, so that insertion of a cassette proceeds easily and rapidly.

An embodiment of the invention will now be described in more detail, by way of example, with reference to the accompanying drawings.

BRIEF DESCRIPTION OF THE DRAWINGS

FIG. 3 is a plan view of a magnetic-tape cassette which can be inserted into the cassette holder of FIG. 1, FIG. 4 is a perspective view of a part of the holder of FIG. 1 during insertion of the magnetic-tape cassette of FIG. 3, FIG. 5 is an enlarged-scale sectional view of the cassette holder taken on the lines V—V in FIG. 1, and FIG. 6 is a perspective view similar to that in FIG. 5, showing a cassette holder in accordance with a second embodiment of the invention.

DESCRIPTION OF THE PREFERRED EMBODIMENTS

Figure 1:
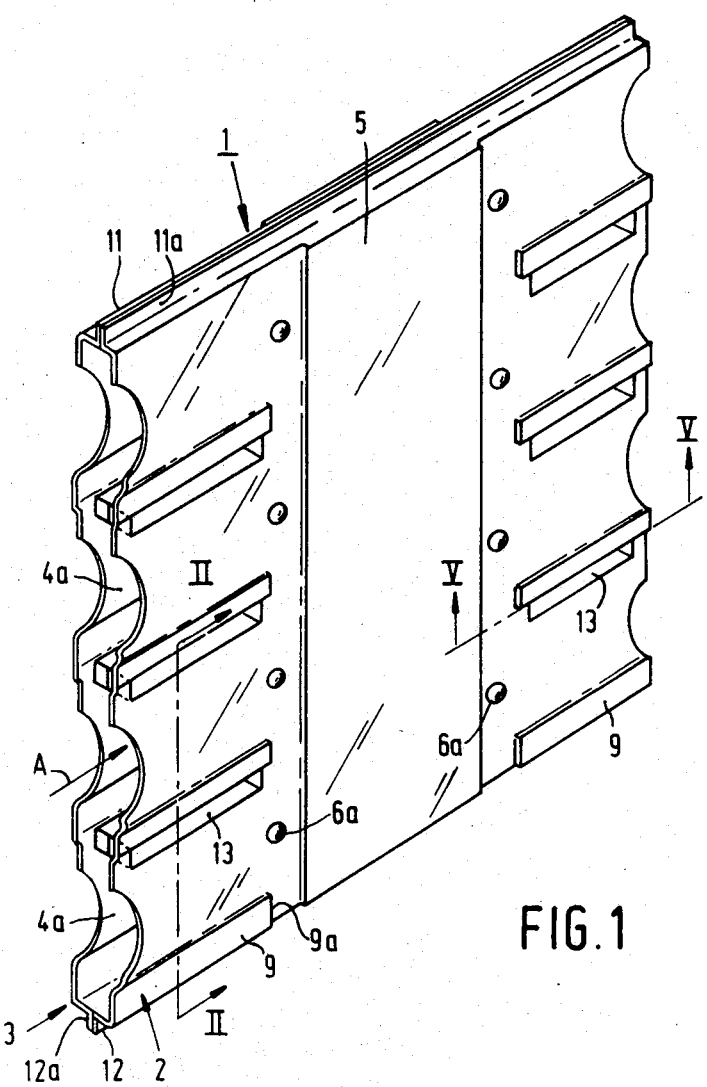
FIG. 1 is a perspective view of a cassette holder in accordance with the invention.
Figure 2:
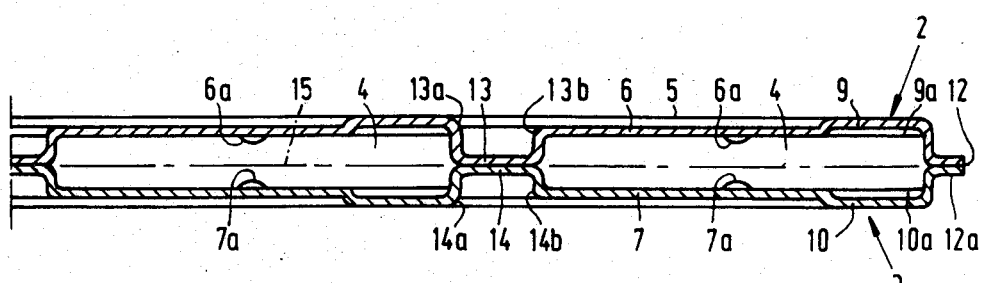
FIG. 2 is an enlarged-scale sectional view of the cassette holder, taken on the lines II—II in FIG. 1.

The cassette holder 1 shown in FIGS. 1 and 2 comprises two identical plastic holder halves 2 and 3, which have been manufactured from a PVC sheet material, for example by vacuum-forming. This sheet material may have a thickness of, for example, 0.9 mm and is transparent. Any other transparent material may be used, provided that its rigidity is adequate, and the holder halves may also be formed by means of other processes such as injection molding. Further, the two holder halves may be formed in one piece, in which case the holder halves are interconnected by an integral hinge near one of the outer edges of the cassette holder.

The cassette holder 1 comprises two rows of compartments 4, which rows each comprises four compartments in the present example. Between the rows each holder half comprises a flat central portion 5, which extends over the entire height of the holder, as is shown in FIG. 1, and which provides room for a label on which notes about the magnetic-tape cassettes contained in the compartments can be made.

At the edge of the holder each compartment 4 has an insertion opening 4a and two mutually parallel holder walls 6 and 7, which form part of the first holder half 2 and the second holder half 3, respectively. Each holder wall has a guide channel 9 and 10, which projects from the adjoining holder wall 6 and 7, respectively and which extends from the insertion opening 4a in the longitudinal direction parallel to the arrow A. The arrow A indicates the direction in which a magnetic-tape cassette 8 is inserted into the compartment 4 (see FIGS. 4 and 5). At the end which is remote from the insertion opening 4a each guide channel 9 and 10 has an end wall 9a and 10a, respectively whose function will be explained hereinafter. Further, each holder wall 6 and 7 is formed with a clamping element 6a and 7a, respectively, whose position and function will also be described hereinafter. The clamping element is formed by an inward embossment of the holder wall.

The two rows of four compartments 4 are arranged in such a way relative to each other that the outer edges of the holder 1 form a square. The holder halves 2 and 3 are interconnected at the outer edges 11 and 12, for example by welding. Between the adjacent compartments 4 of the two rows the holder halves 2 and 3 are also interconnected, namely by elongate connecting elements 13 and 14, respectively which are situated between the respective compartments 4 and which are recessed relative to the holder walls 6 and 7, respectively. The connecting elements 13 and 14 are also interconnected in a suitable manner, for example by welding. The longitudinal axes of the connecting elements 13 and 14 extend parallel to the arrow A in FIG. 4. The wall portions 13a, 14a and 13b, 14b of each pair of adjoining connecting elements 13 and 14, respectively constitute side walls of the compartments 4. Viewed in the direction of insertion both sides of the compartments thus have guides for inserting the cassette 8. The parts of the compartments 4 and the connecting elements 13 and 14 in the holder halves 2 and 3 are disposed mirror-symmetrically relative to a plane of symmetry 15 in FIG. 2.

The cassette holder 1 is intended for storing cassettes 8 of the "Compact cassette" type. Such cassettes comprise a cassette housing as shown in FIGS. 3, 4 and 5, which housing comprises two substantially rectangular mutually parallel major walls 16 and 17, two mutually parallel short side walls 18 and 19, and two mutually parallel long side walls 20 and 21, respectively. Since the two major walls 16 and 17 are disposed mirror-symmetrically relative to each other and have similar shapes only the major wall 16 will be described hereinafter. It is evident that the major wall 17 comprises similar parts. The major wall 16 has a base surface 16a which extends inwardly from the periphery of the cassette, as shown in FIG. 3. A central surface 16b is situated at a lower lever than the base surface 16a and is surrounded by an edge wall portion 16c, which is rectangular in the plan view of FIG. 3, which is situated at a short distance from the short side walls 18 and 19 and which extends parallel to these side walls. A raised elongate housing portion 22 projects from the major wall 16, adjoins the long side wall 21 and comprises upright walls 22a and 22b, respectively at opposite ends. In the major wall 16, in particular in the central portion 15b, two openings 23 are formed beneath which hubs 24 of tape reels are situated, the openings 23 allowing drive spindles of a magnetic-tape-cassette apparatus to be coupled to the hubs 24. Further, a window 25 is present in the central surface 16b.

For inserting the cassette 8 into a compartment 4 the location of the clamping element 6a and 7a in the holder wall 6 and 7, respectively is important. In this respect it is essential that for the compartment 4 the distance, indicated by the reference numeral 26 in FIGS. 4 and 5, between the end walls 9a and 10a and the clamping elements 6a and 7a, respectively, measured in a plane parallel to the holder walls 6 and 7, respectively in a direction parallel to the longitudinal axes of the guide channels 9 and 10, respectively, is substantially equal to the distance, indicated by the reference numeral 27 in FIG. 3, between sides 22a and 22b of the housing portion 22 which face the short side walls 18 and 19, respectively and the edge wall portion 16c situated near these short side walls 18 and 19, respectively, which distance 27 is measured in a plane parallel to the major wall 16 or 17 in a direction parallel to the long side walls 20, 21 of the cassette 8. This location of the clamping elements 6a and 7a ensures that after insertion of the cassette and abutment of the upright wall 22a or 22b against the end wall 9a or 10a the clamping element 6a or 7a has slid over the portion of the base surface 16a which is situated adjacent the short side wall 18 or 19 and the clamping element has engaged behind the edge wall 16c. Insertion is smooth owing to the effective guidance on both sides of the compartment 4. The clamping element 6a or 7a slides over the central surface over a short distance only, then snaps immediately behind the edge wall portion 16c and keeps the cassette urged against the end wall 9a or 10a of the guide channel, thereby ensuring that the cassette is firmly retained in the compartment. Owing to the properties of the plastic material used for the cassette holder the cassette 8 can readily be removed from the compartment 4. It is advantageous that the edge wall 16c extends parallel to the short side walls 16 and 17, respectively over some length. This provides some freedom as regards the choice of the location of the clamping elements 6a and 7a relative to the long side walls 20 and 21, respectively, provided that the distances 26 and 27 are substantially equal to each other.

The cassette holder in accordance with the invention is particularly suitable for the storage of a collection of cassettes. The individual cassettes merely have to be inserted into the compartments to obtain a collection of eight cassettes which are stored in an easy and conveniently arranged manner. An advantage of the cassette holder in accordance with the invention is that the dimensions at the outer edges may correspond substantially to the outer dimensions of a 30-cm (12 inch) long-play record sleeve. This enables the cassette holder in accordance with the invention to be stored together with a collection of long-play records, and/or to be stored in a rack intended for the storage of a long-play record. Another advantage of this is that the cassettes remain visible through the transparent material of the cassette holder and the contents of the holder can be marked on the label on the central portion 5. The cassette holder can be manufactured cheaply and is therefore very suitable for mass production.

The cassette holder 1 shown in FIG. 6 is largely constructed in the same way as that shown in the preceding Figures. A difference with the preceding embodiment is the construction of the lateral edges of the holder near the insertion openings 9a of the compartments 4. The holder walls 6 and 7 now have edge portions 6b and 7b which are situated at a distance from one another which corresponds to the distance between the parallel bottom portions of the guide channels 9 and 10. Consequently, the edge portion 6b is situated at the same level as the bottom portion of the guide channel 9 and the same applies to the edge portion 7b relative to the bottom portion of the guide channel 10. The distances between the other parts of the holder walls 6 and 7 correspond to those in the preceding embodiment. The advantage of the present positions of the edge portions 6b and 7b is that the cassette can easily and rapidly be inserted into the compartment 4. In FIG. 6 the clamping element 6a is situated at another location in comparison with the preceding embodiment, namely somewhat nearer the long side wal 20 of the cassette 8. This is also the case with the clamping element 7a in a manner, not shown. For this reference is made to the above remark about the location of the clamping element. In the present embodiment the orientation of the end walls 9a and 10a of the guide channel has been adapted to the shape of the upright walls 22a and 22b of the raised housing portion 22. This ensures that the end walls 9a and 10a abut correctly against the edge walls 22a and 22b after insertion of the cassette. Again the distances 26 and 27 are substantially equal to each other.

It is to be noted that other embodiments of the cassette holder are possible within the scope of the invention. For example, the connecting elements 12 may also be arranged near the outer edges 11 and 12 of the holder 1, in which case the two holder halves need not be provided with a connecting portion 11a and 12a, respectively. If these portions are present they may be finished by means of a trim which is slid onto the edges 11 and 12. Further, the dimensions of the holder edges may be different, so that for example two rows of three cassettes can be stored.

What is claimed is:

1. A cassette holder having a plurality of cassette compartments,
each compartment being configured to receive a magnetic-tape cassette inserted therein, the cassette being of a type having two parallel substantially rectangular major walls, two short side walls and two parallel long side walls, said side walls being substantially perpendicular to said major walls; each major wall having a base surface, and a raised housing portion extending in a longitudinal direction adjoining one of said long side walls, each compartment having two parallel holder walls, each having an outer edge, said edges defining a cassette insertion opening; a guide channel formed in at least one of said holder walls extending from said opening in an insertion direction, said guide channel being arranged to guide the raised housing portion of a cassette when the cassette is inserted along said longitudinal direction into the compartment; a stop arranged to engage a cassette which is inserted fully into the compartment; and a clamping element projecting from an inner surface of a holder wall to clamp a cassette which has been inserted so as to engage said stop, characterized in that the holder consists of two mirror-image portions formed of a plastic sheet material, said clamping elements formed by dimples in the sheet material, said each holder wall of each compartment has a guide channel and a clamping element formed therein, and said holder walls are mirror-symmetrical;

at an end remote from the insertion opening, each guide channel has an end wall which forms said stop, each clamping element is disposed near an end of the compartment remote from the insertion opening, arranged such that, when one of said cassettes inserted into the respective compartment has a central surface recessed with respect to said major wall base surface, and an edge parallel to the cassette short wall between said central and base surface, the clamping element acts against and engages a portion of the respective major wall of the cassette adjacent the short side wall remote from the insertion opening, behind said edge of the one cassette, and each holder comprises two rows of compartments, each row having its respective insertion openings in line, said rows being spaced from each other; and a raised flat central portion disposed on each side of the holder, said holder walls and flat central portions being substantially parallel.

2. A holder as claimed in claim 1, characterized in that the holder has outer edges arranged as a square, said outer edges having major dimensions substantially equal to corresponding dimensions of a sleeve for a 12-inch long play phonograph record.

3. A cassette holder having a plurality of cassette compartments, each compartment being configured to receive a magnetic-tape cassette inserted therein, the cassette being of a type having two parallel substantially rectangular major walls, two short side walls and two parallel long side walls, said side walls being substantially perpendicular to said major walls; each major wall having a base surface, and a raised housing portion extending in a longitudinal direction adjoining one of said long side walls, each compartment having two parallel holder walls, each having an outer edge, said edges defining a cassette insertion opening; a guide channel formed in at least one of said holder walls extending from said opening in an insertion direction, said guide channel being arranged to guide the raised housing portion of a cassette when the cassette is inserted along said longitudinal direction into the compartment; a stop arranged to engage a cassette which is inserted fully into the compartment; and a clamping element projecting from an inner surface of a holder wall to clamp a cassette which has been inserted so as to engage said stop, characterized in that said holder has two rows of compartments, each row having insertion openings in line; and said holder comprises two identical plastic holder halves in which the holder walls are situated, which holder halves are interconnected between elongate connecting elements arranged between and adjacent said compartments of a row, said each holder wall of each compartment has a guide channel having a bottom portion and a clamping element formed therein, and said holder walls are mirror-symmetrical;

at an end remote from the insertion opening, each guide channel has an end wall which forms said stop, the holder comprises holder walls between adjacent compartments of a row and connected to each other in pairs to interconnect the two holder halves, and each clamping element is disposed near an end of the compartment remote from the insertion opening, arranged so as to act against a portion of the respective major wall of the cassette adjacent the short side wall remote from the insertion opening.

4. A holder as claimed in claim 3, characterized in that the holder consists of two mirror-image portions formed of a plastic sheet material, said clamping elements being formed by dimples in the sheet material.

5. A holder as claimed in claim 3, characterized in that said connecting elements have a longitudinal axes extending parallel to said insertion direction, and each holder half further comprises wall portions perpendicular to said holder walls, extending between the respective holder wall and the respective adjoining connecting elements, said wall portions of a pair of adjoining connecting elements forming side walls of the respective compartments.

6. A holder as claimed in claim 5, characterized in that, for each respective compartment, one of said side walls formed by wall portions adjoins a guide channel.

7. A holder as claimed in claim 6, characterized in that near each insertion opening, each respective holder wall comprises a raised edge portion disposed at a same level as the bottom portion of the respective guide channel.

8. A holder as claimed in claim 7, characterized in that the holder consists of two mirror-image portions formed of a plastic sheet material, said clamping elements being formed by dimples in the sheet material, two longitudinal edges of said holder extending parallel to said insertion direction being formed by edge-connecting elements formed in said holder halves, recessed with respect to said respective holder walls, respective adjoining edge-connecting elements being permanently secured to each other.

9. A holder as claimed in claim 5, characterized in that near each insertion opening, each respective holder wall comprises a raised edge portion disposed at a same level as the bottom portion of the respective guide channel.

10. A holder as claimed in claim 3, characterized in that near each insertion opening, each respective holder wall comprises a raised edge portion disposed at a same level as the bottom portion of the respective guide channel.

* * * * *